United States Patent
Kume et al.

(10) Patent No.: US 8,475,048 B2
(45) Date of Patent: Jul. 2, 2013

(54) DYNAMIC FOIL GAS BEARING

(75) Inventors: Yasuhisa Kume, Utsunomiya (JP); Noriyuki Mizojiri, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 115 days.

(21) Appl. No.: 13/076,036

(22) Filed: Mar. 30, 2011

(65) Prior Publication Data

US 2011/0243485 A1 Oct. 6, 2011

(30) Foreign Application Priority Data

Mar. 30, 2010 (JP) ................................ 2010-079462

(51) Int. Cl.
*F16C 32/06* (2006.01)

(52) U.S. Cl.
USPC .......................................... 384/106; 384/103

(58) Field of Classification Search
USPC ................................................ 384/103, 106
See application file for complete search history.

(56) References Cited

U.S. PATENT DOCUMENTS

| | | | | |
|---|---|---|---|---|
| 4,300,806 A | * | 11/1981 | Heshmat | 384/103 |
| 4,415,280 A | * | 11/1983 | Agrawal | 384/103 |
| 6,450,688 B2 | | 9/2002 | Matsushima | |
| 7,070,330 B2 | * | 7/2006 | Agrawal | 384/106 |
| 2003/0012466 A1 | | 1/2003 | Shimizu et al. | |
| 2006/0018574 A1 | * | 1/2006 | Kang et al. | 384/106 |
| 2008/0253704 A1 | * | 10/2008 | Struziak et al. | 384/106 |

FOREIGN PATENT DOCUMENTS

| | | |
|---|---|---|
| EP | 1566556 A2 | 8/2005 |
| EP | 1980761 A2 | 10/2008 |
| JP | 2001-295836 | 10/2001 |

OTHER PUBLICATIONS

European Office Action for Application No. 11160166.2, 7 pages, Mar. 30, 2012.

* cited by examiner

*Primary Examiner* — Thomas R Hannon
(74) *Attorney, Agent, or Firm* — Nelson Mullins Riley & Scarborough LLP; Anthony A. Laurentano

(57) ABSTRACT

A dynamic foil gas bearing includes a foil group comprising a corrugated-sheet-like bump foil, a flat-sheet-like middle foil, and a flat-sheet-like top foil which are arranged successively toward the center axis of a bearing case. The top foil includes a second linkage surface joined to a second fixed surface fixed to an inner circumferential surface of the bearing case and also joined to a second rotatable shaft holding surface. The second linkage surface is provided by a curved portion of the top foil which is convex toward the center axis of the bearing case. The middle foil includes a first linkage surface joined to a first fixed surface fixed to the inner circumferential surface of the bearing case and also joined to a first rotatable shaft holding surface. The first linkage surface is provided by a bent straight portion of the middle foil.

3 Claims, 8 Drawing Sheets

DYNAMIC FOIL GAS BEARING

CROSS-REFERENCE TO RELATED APPLICATION

This application is based upon and claims the benefit of priority from Japanese Patent Application No. 2010-079462 filed on Mar. 30, 2010, of which the contents are incorporated herein by reference.

BACKGROUND OF THE INVENTION

1. Field of the Invention

The present invention relates to a dynamic foil gas bearing that includes a hollow cylindrical member with a rotatable shaft inserted therein and a group of foils mounted on an inner circumferential surface of the hollow cylindrical member, for supporting the rotatable shaft in a journal direction.

2. Description of the Related Art

Generally, centrifugal compressors are used in the art as superchargers for efficiently supplying compressed air. For example, a centrifugal compressor is used as an auxiliary for supplying an engine with compressed air or an auxiliary for supplying a fuel cell with compressed air as an oxygen-containing gas.

It has been desired that central compressors of the type described above rotate at a considerably high speed. Japanese Laid-Open Patent Publication No. 2001-295836 discloses a foil fluid bearing for use as a high-speed bearing.

As shown in FIG. 8 of the accompanying drawings, the disclosed foil fluid bearing comprises a hollow cylindrical stationary holding member 2 nonrotatably fixed in position around the outer circumferential surface of a journal 1, and a foil assembly 3 disposed in an annular clearance between the inner circumferential surface of the stationary holding member 2 and the outer circumferential surface of the journal 1. The foil assembly 3 includes a top foil 4 disposed at a radially inner position, a middle foil 5 disposed radially outwardly of the top foil 4, and six bump foils 6 disposed radially outwardly of the middle foil 5.

The top foil 4 comprises a flat sheet curved into a substantially hollow cylindrical shape and has an end secured to an upper portion of the inner circumferential surface of the stationary holding member 2 by a welded region 4a. The middle foil 5, which also comprises a flat sheet curved into a substantially hollow cylindrical shape, has an end secured to the inner circumferential surface of the stationary holding member 2 by a welded region 5a near the welded region 4a.

The top foil 4 extends clockwise from the end secured by the welded region 4a toward the other end thereof. The middle foil 5 extends counterclockwise from the end secured by the welded region 5a toward the other end thereof. The top foil 4 has an outer circumferential surface and the middle foil 5 has an inner circumferential surface. The outer circumferential surface of the top foil 4 and the inner circumferential surface of the middle foil 5 are held in sliding contact with each other as sliding surfaces 7.

The top foil 4 includes a crank-shaped portion or angularly bent portion extending from the welded region 4a to the sliding surface 7 thereof, and the middle foil 5 also has a crank-shaped portion or angularly bent portion extending from the welded region 5a to the sliding surface 7 thereof. While the foil fluid bearing is in operation, the bump foils 6 are elastically deformed toward the inner circumferential surface of the stationary holding member 2 under an air pressure developed when the journal 1 rotates about its own axis. At this time, the top foil 4 is deformed about the crank-shaped portion, tending to form an edgy corner. When such an edgy corner is formed, the outer circumferential surface of the journal 1 is brought into sliding contact with the edgy corner and unduly wears the top foil 4.

SUMMARY OF THE INVENTION

It is an object of the present invention to provide a dynamic foil gas bearing which is simple in structure, prevents a rotatable shaft from contacting a bent portion of a top foil thereby to avoid undue wear of the top foil, and is effective to prevent itself from becoming less rigid and to suppress abnormal vibration, as much as possible.

According to the present invention, there is provided a dynamic foil gas bearing comprising a hollow cylindrical member with a rotatable shaft inserted therein, and a foil group mounted on an inner circumferential surface of the hollow cylindrical member, for supporting the rotatable shaft in a journal direction.

The foil group comprises a sheet-like bump foil, a sheet-like middle foil, and a sheet-like top foil which are arranged successively toward the central axis of the hollow cylindrical member. The middle foil includes a first fixed surface fixed to an inner circumferential surface of the hollow cylindrical member, and a first rotatable shaft holding surface extending along the direction in which the rotatable shaft rotates, the first rotatable shaft holding surface having an end joined to the first fixed surface by a first linkage surface and an opposite end as a free end, the first rotatable shaft holding surface serving to restrain the rotatable shaft circumferentially.

The top foil includes a second fixed surface fixed to the inner circumferential surface of the hollow cylindrical member, and a second rotatable shaft holding surface extending along the direction opposite to the direction in which the rotatable shaft rotates, the second rotatable shaft holding surface having an end joined to the second fixed surface by a second linkage surface and an opposite end as a free end, the rotatable shaft holding surface serving to restrain the rotatable shaft circumferentially.

The first linkage surface is provided by a bent straight portion of the middle foil, and the second linkage surface is provided by a curved portion of the top foil which is convex toward the central axis of the hollow cylindrical member.

According to the present invention, the second linkage surface of the top foil which is joined to the second fixed surface fixed to the inner circumferential surface of the hollow cylindrical member and is also joined to the second rotatable shaft holding surface, is provided by a curved portion of the top foil which is convex toward the central axis of the hollow cylindrical member. Therefore, when the bump foil is elastically deformed due to the rotation of the rotatable shaft, the second linkage surface of the top foil is prevented from being bent into contact with the outer circumferential surface of the rotatable shaft. Consequently, the top foil is prevented from unduly wearing, as much as possible.

In addition, the first linkage surface of the middle foil which is joined to the first fixed surface fixed to the inner circumferential surface of the hollow cylindrical member and is also joined to the first rotatable shaft holding surface, is provided by a bent straight portion of the middle foil. Accordingly, the first linkage surface is effective to prevent the fixed portion from being reduced in rigidity, so that abnormal vibration is not caused upon high-speed rotation of the rotatable shaft, and hence high-speed stability thereof can be maintained suitably.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
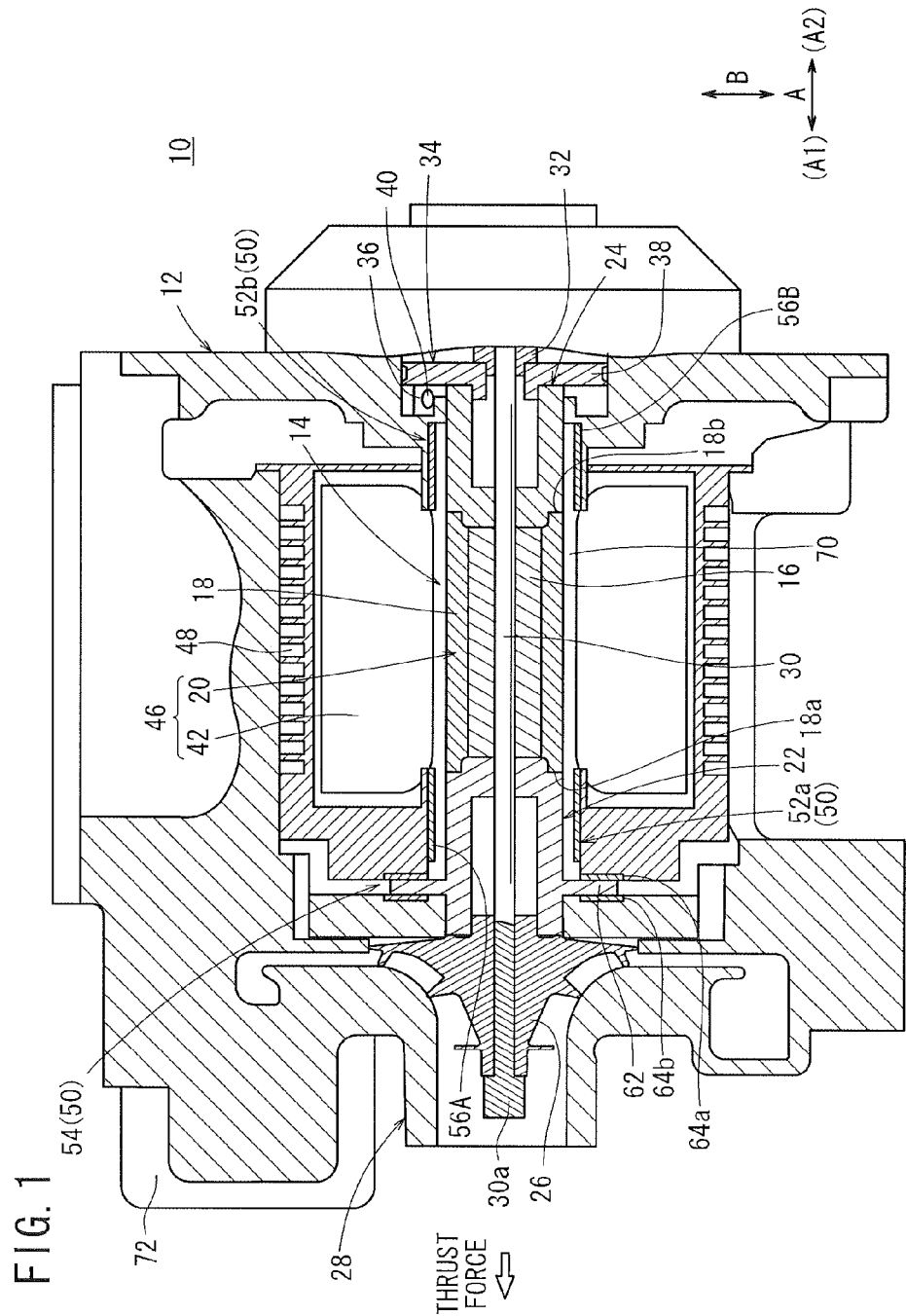
FIG. 1 is a cross-sectional view of a centrifugal compressor which incorporates a dynamic foil gas bearing according to an embodiment of the present invention.

As shown in FIG. 1, a centrifugal compressor (supercharger) 10 which incorporates a dynamic foil gas bearing according to an embodiment of the present invention includes a casing 12 in which a rotatable shaft unit 14 is rotatably mounted.

Figure 2:
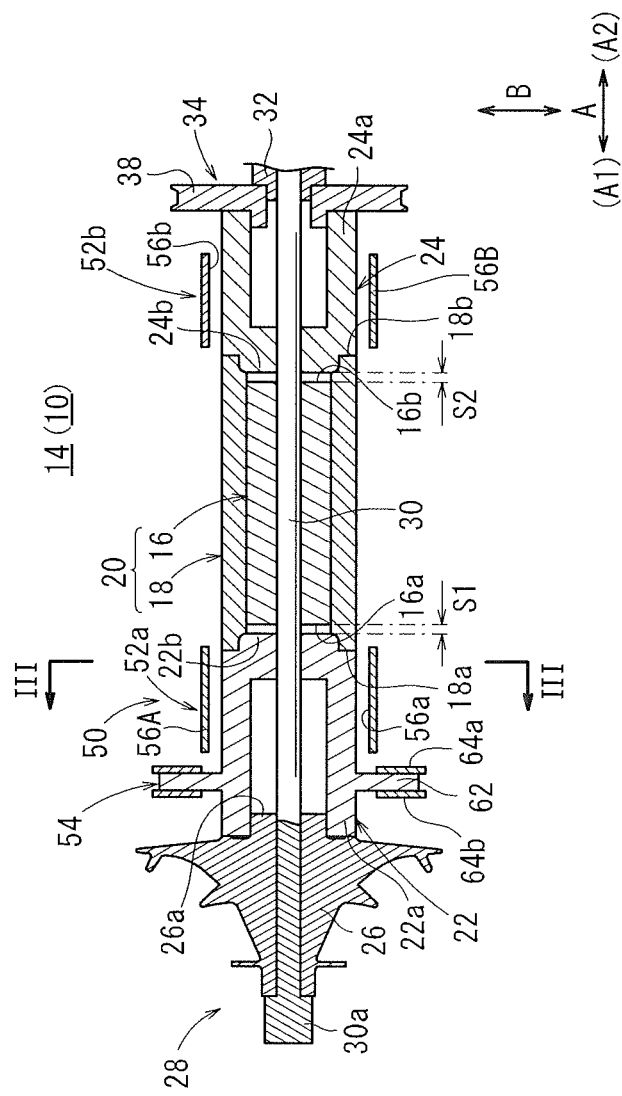
FIG. 2 is a cross-sectional view of main components of the centrifugal compressor.

As shown in FIGS. 1 and 2, the rotatable shaft unit 14 comprises a rotor 20 having an annular permanent magnet 16 and a hollow cylindrical protective sleeve 18 disposed around the permanent magnet 16 and housing therein the permanent magnet 16, which may be shrink-fit in the protective sleeve 18, for example, a pair of bearing shafts 22, 24 mounted on respective axial opposite ends or at least one axial end of the rotor 20, and an impeller 26 mounted on the axial end of the bearing shaft 22 that is remote from the rotor 20.

The impeller 26 serves as part of a centrifugal compression unit 28 and has an end face held against a large-diameter end 30a of a tension shaft 30. The tension shaft 30 which extends axially through the impeller 26 supports thereon the bearing shaft 22, the rotor 20, and the bearing shaft 24 which are arranged successively in the order named from the impeller 26. The bearing shaft 22, the rotor 20, and the bearing shaft 24 are integrally held together on the tension shaft 30 by a fastening member 32 that is threaded over the end of the tension shaft 30 which is remote from the large-diameter end 30a thereof.

The fastening member 32 supports thereon a canceler mechanism 34 for reducing thrust force that is generated along the direction indicated by the arrow A1 when the rotatable shaft unit 14 rotates about its own axis. As shown in FIG. 1, the canceler mechanism 34 includes a canceler disk 38 which is slidable in a pressurization chamber 36 along the directions indicated by the arrow A. When the impeller 26 rotates about its own axis, air is generated, and the generated air flows into the pressurization chamber 36 through a passageway 40.

The casing 12 houses therein an annular stator 42 fixedly disposed around the rotor 20. The stator 42 and the rotor 20 jointly make up a motor 46.

The protective sleeve 18, which is part of the rotor 20 and is required to be of high rigidity, is made of nickel-based superalloy, e.g., Inconel (tradename of Special Metals Corporation). A plurality of coolant water channels 48 extend around the stator 42.

As shown in FIG. 2, the protective sleeve 18 has hollow cylindrical protrusions 18a, 18b disposed on its opposite ends on which the bearing shafts 22, 24 are mounted. The protrusions 18a, 18b project axially outwardly beyond respective end faces 16a, 16b of the permanent magnet 16.

The bearing shaft 22 includes a hollow cylindrical member 22a which is open at an axial end thereof and a bottom 22b which is disposed at an opposite axial end thereof and projects radially inwardly to the tension shaft 30. Similarly, the bearing shaft 24 includes a hollow cylindrical member 24a which is open at an axial end thereof and a bottom 24b which is disposed at an opposite axial end thereof and projects radially inwardly to the tension shaft 30.

The bottom 22b of the bearing shaft 22 is held in contact with the hollow cylindrical protrusion 18a of the protective sleeve 18, and the bottom 24b of the bearing shaft 24 is held in contact with the hollow cylindrical protrusion 18b of the protective sleeve 18. The bottoms 22b, 24b and the end faces 16a, 16b of the permanent magnet 16 are spaced from each other by respective distances S1, S2.

A foil gas bearing (dynamic foil gas bearing) 50 which holds the bearing shafts 22, 24 is disposed in confronting relation to outer circumferential surfaces of the bearing shafts 22, 24. The foil gas bearing 50 comprises journal air bearings 52a, 52b according to the present embodiment which hold the bearing shafts 22, 24 in their radial positions and a thrust air bearing 54 which holds the bearing shaft 22 in its axial position.

The bearing shafts 22, 24 make up a rotatable shaft which is supported in a journal direction by the journal air bearings 52a, 52b. The bearing shafts 22, 24 are made of the same nickel-based superalloy as the protective sleeve 18, for example. When the bearing shafts 22, 24 are at rest, they are restrained by the journal air bearings 52a, 52b. When the bearing shafts 22, 24 are in rotation, air layers are formed between the bearing shafts 22, 24 and the journal air bearings 52a, 52b.

The journal air bearings 52a, 52b comprise respective annular bearing cases (hollow cylindrical members) 56A, 56B disposed around the outer circumferential surfaces of the bearing shafts 22, 24 with prescribed clearances therebetween, and foil groups 57 (see FIG. 3) disposed respectively on inner circumferential surfaces 56a, 56b of the bearing cases 56A, 56B. The bearing shafts 22, 24 are rotatably supported by the bearing cases 56A, 56B, which are nonrotatably fixed in position.

Figure 3:
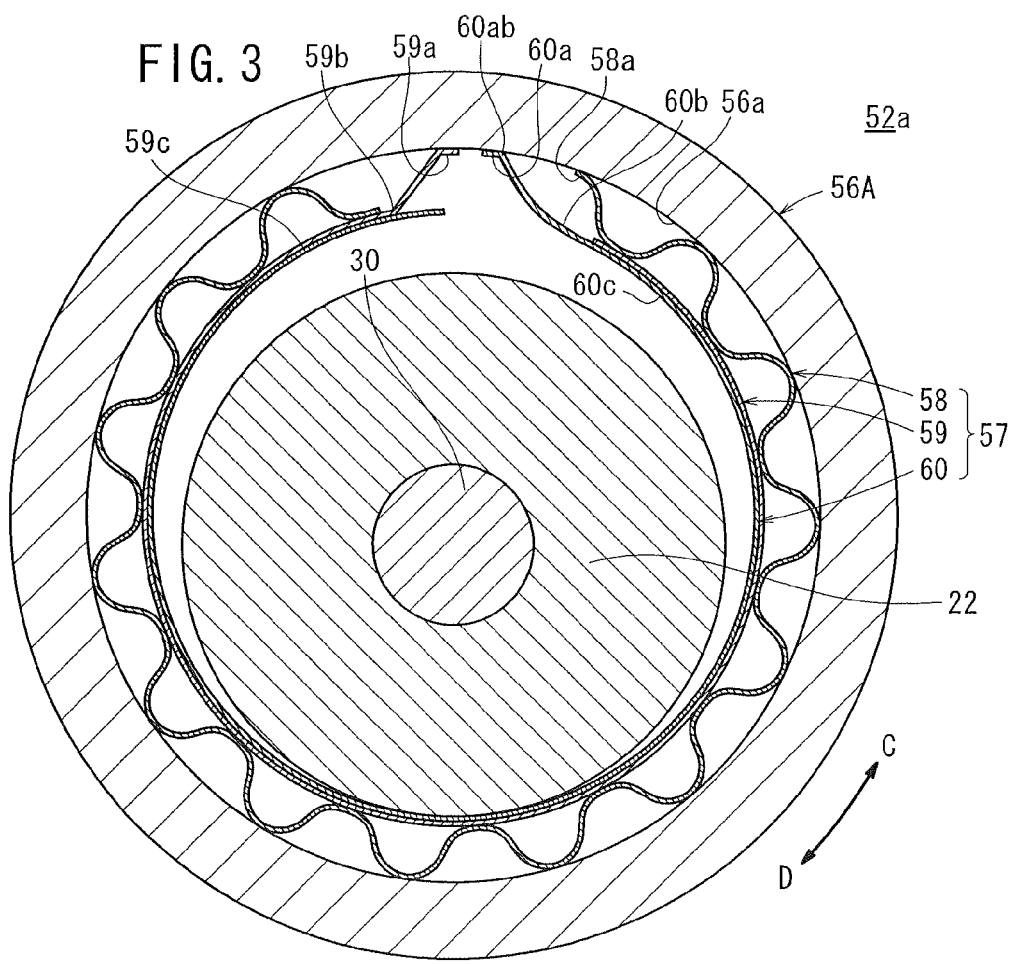
FIG. 3 is a cross-sectional view of the centrifugal compressor, taken along line III-III of FIG. 2.

As shown in FIG. 3, the foil group 57 in the bearing case 56A includes a corrugated-sheet-like bump foil 58, a flat-sheet-like middle foil 59, and a flat-sheet-like top foil 60 which are arranged successively toward the central axis of the bearing case 56A. Each of the corrugated-sheet-like bump foil 58, the flat-sheet-like middle foil 59, and the flat-sheet-like top foil 60 is in the form of an elastic metal member. The bump foil 58 comprises a single foil or a plurality of foils and has an end 58a fixed by welding or the like to the inner circumferential surface 56a of the bearing case 56A and an opposite end as a free end.

The middle foil 59 includes a first fixed surface 59a fixed by welding or the like to the inner circumferential surface 56a of the bearing case 56A, and a first rotatable shaft holding surface 59c extending along the direction in which the bearing shaft 22 rotates, i.e., the direction indicated by the arrow C. The first rotatable shaft holding surface 59c has an end joined to the first fixed surface 59a by a first linkage surface 59b and an opposite end as a free end. The first rotatable shaft holding surface 59c serves to restrain the bearing shaft 22 circumferentially.

The top foil 60 includes a second fixed surface 60a fixed by welding or the like to the inner circumferential surface 56a of the bearing case 56A, and a second rotatable shaft holding surface 60c extending along the direction (the direction indicated by the arrow D) which is opposite to the direction in which the bearing shaft 22 rotates, i.e., the direction indicated by the arrow C. The second rotatable shaft holding surface 60c has an end joined to the second fixed surface 60a by a second linkage surface 60b and an opposite end as a free end. The second rotatable shaft holding surface 60c serves to restrain the bearing shaft 22 circumferentially. The second fixed surface 60a is disposed in a position adjacent to the first fixed surface 59a.

The first linkage surface 59b is provided by a bent straight portion of the middle foil 59. The second linkage surface 60b is provided by a curved portion of the top foil 60 which is convex toward the central axis of the bearing case 56A. The free end of the top foil 60 extends toward the first fixed surface 59a side (i.e., along the direction indicated by the arrow D) in covering relation to the first linkage surface 59b. The bearing case 56B and the foil group 57 disposed therein are of the same structure as the bearing case 56A and the foil group 57 disposed therein.

As shown in FIGS. 1 and 2, the bearing shaft 22 has a large-diameter flange 62 projecting radially outwardly from the outer circumferential surface thereof. The large-diameter flange 62 is sandwiched between ring members 64a, 64b that are disposed on respective axially opposite sides thereof. The large-diameter flange 62 and the ring members 64a, 64b jointly make up the thrust air bearing 54.

Figure 4:
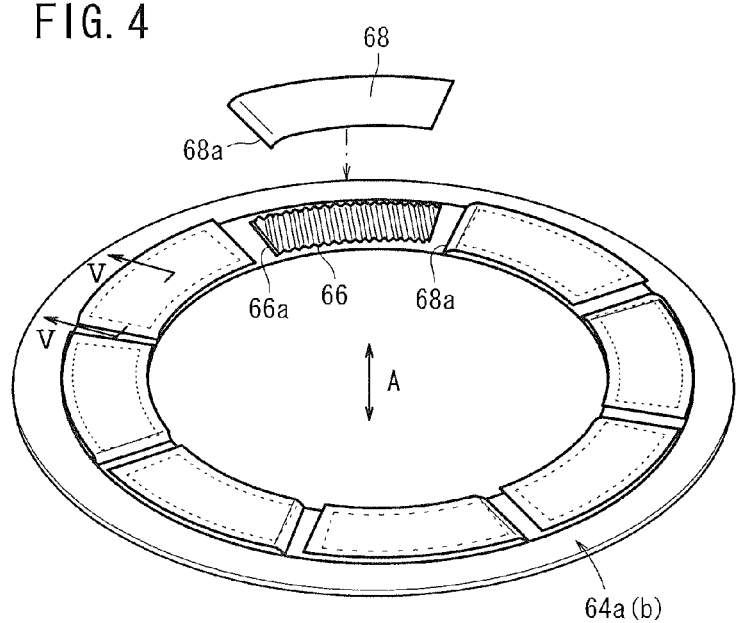
FIG. 4 is a perspective view of a thrust air bearing of the centrifugal compressor.

As shown in FIG. 4, each of the ring members 64a, 64b has corrugated-sheet-like bump foils 66 and flat-sheet-like top foils 68 disposed on a surface thereof that faces the large-diameter flange 62. The bump foils 66 and the top foils 68 are superposed and arrayed in an annular pattern along an inner circumferential edge of each of the ring members 64a, 64b.

Figure 5:
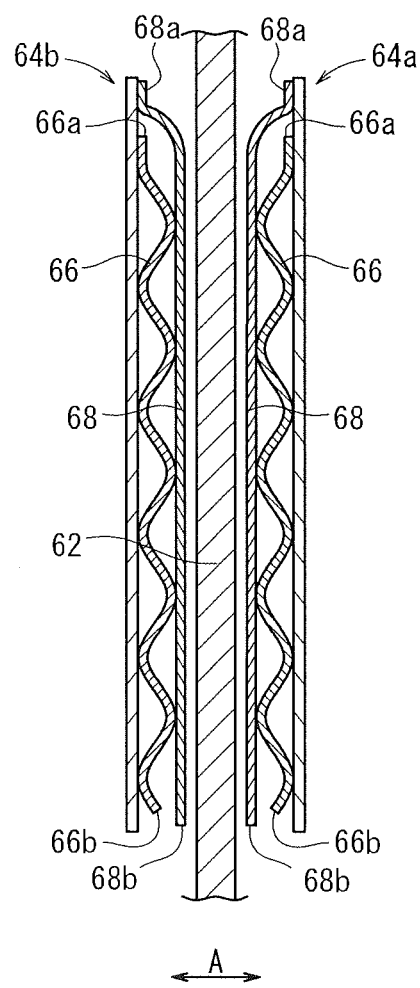
FIG. 5 is a cross-sectional view of the thrust air bearing, taken along line V-V of FIG. 4.

As shown in FIG. 5, each of the bump foils 66 has an end 66a welded to one of the ring members 64a, 64b and an opposite end 66b as a free end. Each of the top foils 68 has an end 68a welded to one of the ring members 64a, 64b and an opposite end 68b as a free end.

As shown in FIG. 2, the impeller 26 has an axial end 26a which is remote from the large-diameter end 30a of the tension shaft 30 and coaxially fitted in the hollow cylindrical member 22a of the bearing shaft 22 by a spigot-and-socket joint. The bottoms 22b, 24b of the bearing shafts 22, 24 are coaxially fitted respectively in the hollow cylindrical protrusions 18a, 18b of the protective sleeve 18 by a spigot-and-socket joint.

As shown in FIG. 1, the casing 12 has a coolant channel 70 defined between the protective sleeve 18 and the stator 42 of the motor 46. The inlet of the coolant channel 70 and the passageway 40 of the canceler mechanism 34 are connected to a compressor outlet 72 of the centrifugal compression unit 28. When the impeller 26 rotates about its own axis, it compresses air and delivers the compressed air from the compressor outlet 72 into the inlet of the coolant channel 70 and the passageway 40 of the canceler mechanism 34.

Operation of the centrifugal compressor 10 will be described below.

When the stator 42 of the motor 46 is energized, the permanent magnet 16 and the protective sleeve 18 of the rotor 20 rotate in unison with the tension shaft 30. The impeller 26 which is supported on the tension shaft 30 rotates at a relatively high speed, and then draws air from the atmosphere into the centrifugal compression unit 28.

The air that is drawn by the impeller 26 is compressed and fed by the centrifugal compression unit 28 to the oxygen-containing gas supply system of a fuel cell (not shown), for example. The fuel cell is supplied with a fuel gas, i.e., a hydrogen gas, from a fuel gas supply system (not shown). Therefore, the fuel cell generates electric energy based on a reaction between the air that is supplied to the cathode of the fuel cell and the hydrogen that is supplied to the anode of the fuel cell.

Part of the air that is drawn into the centrifugal compression unit 28 is compressed thereby and supplied from the compressor outlet 72 to the coolant channel 70 in the casing 12. The air cools the motor 46 while flowing through the coolant channel 70, and is then discharged out of the centrifugal compressor 10.

Part of the air compressed by the centrifugal compression unit 28 is supplied from the compressor outlet 72 through the passageway 40 of the canceler mechanism 34 to the pressurization chamber 36. When the air flows into the pressurization chamber 36, it applies a pressing force to the canceler disk 38 in the pressurization chamber 36 in a direction away from the impeller 26, i.e., in the direction indicated by the arrow A2. Therefore, the thrust force applied in the direction indicated by the arrow A1 is reduced by the canceler mechanism 34 upon rotation of the impeller 26.

According to the present embodiment, as shown in FIG. 3, each of the foil groups 57 includes the corrugated-sheet-like bump foil 58, the flat-sheet-like middle foil 59, and the flat-sheet-like top foil 60 which are arranged successively toward the central axis of the bearing case 56A.

The second linkage surface 60b of the top foil 60 which is joined to the second fixed surface 60a fixed to the inner circumferential surface 56a of the bearing case 56A and is also joined to the second rotatable shaft holding surface 60c, is provided by a curved portion of the top foil 60 which is convex toward the central axis of the bearing case 56A. Therefore, when the bump foil 58 is elastically deformed, the second linkage surface 60b of the top foil 60 is prevented from being bent into contact with the outer circumferential surface of the bearing shaft 22. Consequently, with a simple structure, the top foil 60 can be prevented from unduly wearing, as much as possible.

Figure 6:
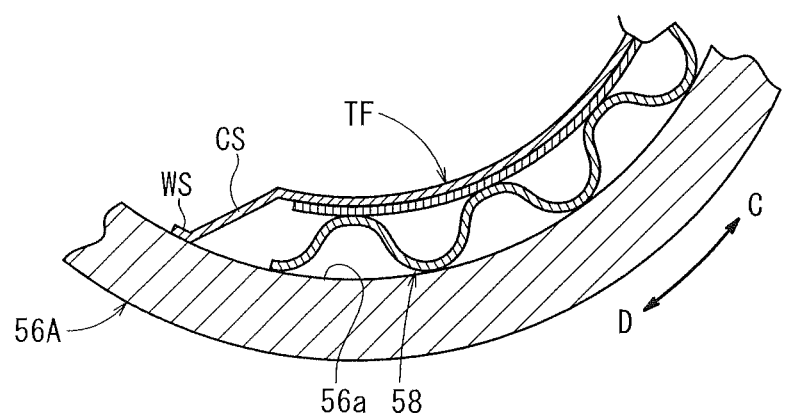
FIG. 6 is a fragmentary cross-sectional view of a journal air bearing according to a comparative example.
Figure 7:
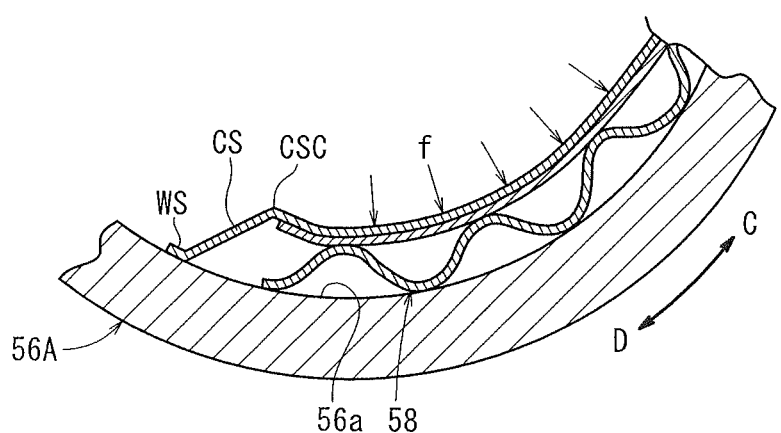
FIG. 7 is a fragmentary cross-sectional view showing the manner in which the journal air bearing according to the comparative example operates.
Figure 8:
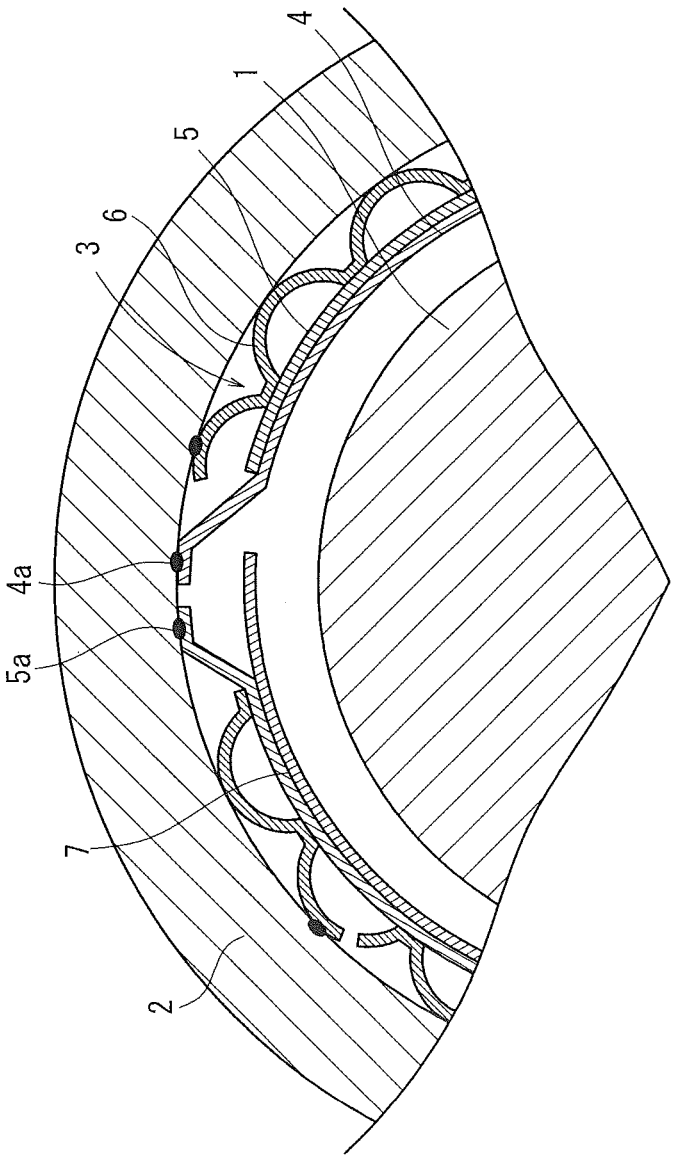
FIG. 8 is a fragmentary cross-sectional view of a foil fluid bearing disclosed in Japanese Laid-Open Patent Publication No. 2001-295836.

Specifically, FIG. 6 shows a journal air bearing according to a comparative example which includes a top foil TF having a angularly bent surface CS that is joined to a fixed surface WS fixed to an inner circumferential surface 56a. When an air pressure f is applied to the top foil TF by air that is drawn upon rotation of the rotational shaft, the top foil TF tends to be elastically deformed about an edgy corner CSC of the angularly bent surface CS, as shown in FIG. 7. Therefore, the edgy corner CSC projects radially inwardly into contact with the rotational shaft, thereby unduly wearing the rotational shaft.

According to the present embodiment, however, the second linkage surface 60b of the top foil 60 is provided by a curved portion of the top foil 60 which is convex toward the central axis of the bearing case 56A. When an air pressure is applied to the top foil 60 upon rotation of the bearing shaft 22, the top foil 60 is liable to be elastically deformed about a boundary 60ab (see FIG. 3) between the second fixed surface 60a and the second linkage surface 60b. Therefore, the top foil 60 is prevented from projecting radially inwardly and hence from unduly wearing, as much as possible.

In addition, the first linkage surface 59b of the middle foil 59 which is joined to the first fixed surface 59a fixed to the inner circumferential surface 56a of the bearing case 56A and is also joined to the first rotatable shaft holding surface 59c, is provided by a bent straight portion of the middle foil 59. Accordingly, the first linkage surface 59b is effective to prevent the fixed portion from being reduced in rigidity, so that abnormal vibration is not caused upon high-speed rotation of the bearing shaft 22, and hence high-speed stability thereof can be maintained suitably.

Moreover, the free end of the top foil 60 extends in the direction indicated by the arrow D in covering relation to the first linkage surface 59b of the middle foil 59. Consequently, the first linkage surface 59b of the middle foil 59 is prevented from being brought into sliding contact with the outer circumferential surface of the bearing shaft 22, and hence is reliably prevented from unduly wearing.

Although a certain preferred embodiment of the present invention has been shown and described in detail, it should be understood that various changes and modifications may be made therein without departing from the scope of the appended claims.

What is claimed is:

1. A dynamic foil gas bearing comprising:
   a hollow cylindrical member with a rotatable shaft inserted therein; and
   a foil group mounted on an inner circumferential surface of the hollow cylindrical member, the dynamic foil gas bearing supporting the rotatable shaft in a journal direction;
   wherein the foil group comprises a sheet-like bump foil, a sheet-like middle foil, and a sheet-like top foil which are arranged successively toward the central axis of the hollow cylindrical member;
   the middle foil including:
   a first fixed surface fixed to an inner circumferential surface of the hollow cylindrical member; and
   a first rotatable shaft holding surface extending along a direction in which the rotatable shaft rotates, the first rotatable shaft holding surface having an end joined to the first fixed surface by a first linkage surface and an opposite end as a free end, the first rotatable shaft holding surface serving to restrain the rotatable shaft circumferentially;
   the top foil including:
   a second fixed surface fixed to the inner circumferential surface of the hollow cylindrical member; and
   a second rotatable shaft holding surface extending along a direction opposite to the direction in which the rotatable shaft rotates, the second rotatable shaft holding surface having an end joined to the second fixed surface by a second linkage surface and an opposite end as a free end, the rotatable shaft holding surface serving to restrain the rotatable shaft circumferentially;
   wherein the first linkage surface is provided by an angularly bent portion of the middle foil, wherein the middle foil further comprises:
   a round portion that is provided circumferentially around the shaft that terminates at a first transition point where the middle foil is angularly bent,
   a straight portion beginning at the first transition point and continuing to a second transition point where the middle foil is angularly bent,
   a welded portion beginning at the second transition point, the welded portion being welded to the inner circumferential surface of the hollow cylindrical member, and
   the second linkage surface is provided by a curved portion of the top foil, as opposed to the bent shape found in the first linkage surface, wherein:
   the top foil includes a second round portion that is provided circumferentially around the shaft such that the round portion is concave towards the central axis of the hollow cylindrical member,
   the second round portion transitions into the second linkage surface wherein the top foil becomes convex towards the central axis of the hollow cylindrical member, and a portion of the top foil that is convex being the second linkage surface, and
   the second linkage surface terminating at an angularly bent portion that transitions into a second welded portion that is welded to the inner circumferential surface of the hollow cylindrical member.

2. The dynamic foil gas bearing according to claim 1, wherein the free end of the top foil extends toward the first fixed surface side in covering relation to the first linkage surface of the middle foil.

3. The dynamic foil gas bearing according to claim 1, wherein the rotatable shaft serves as part of a rotatable shaft unit of a centrifugal compressor, the centrifugal compressor including an impeller coupled to the rotatable shaft unit.

* * * * *